United States Patent
Holtcamp et al.

(10) Patent No.: US 10,611,867 B2
(45) Date of Patent: Apr. 7, 2020

(54) BROAD ORTHOGONAL DISTRIBUTION METALLOCENE POLYETHYLENES FOR FILMS

(71) Applicant: ExxonMobil Chemical Patents Inc., Baytown, TX (US)

(72) Inventors: Matthew W. Holtcamp, Huffman, TX (US); Ching-Tai Lue, Sugarland, TX (US); Adriana S. Silva, Houston, TX (US); Dongming Li, Houston, TX (US); David M. Fiscus, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/806,100

(22) Filed: Nov. 7, 2017

(65) Prior Publication Data

US 2018/0155474 A1    Jun. 7, 2018

Related U.S. Application Data

(60) Provisional application No. 62/430,105, filed on Dec. 5, 2016.

(30) Foreign Application Priority Data

Jan. 20, 2017 (EP) .................................... 17152326

(51) Int. Cl.
| | | |
|---|---|---|
| *C08F 210/16* | (2006.01) | |
| *C08L 23/08* | (2006.01) | |
| *B32B 27/32* | (2006.01) | |
| *C08F 210/02* | (2006.01) | |
| *C08J 5/18* | (2006.01) | |

(52) U.S. Cl.
CPC ............ *C08F 210/02* (2013.01); *B32B 27/32* (2013.01); *B32B 27/327* (2013.01); *C08J 5/18* (2013.01); *C08J 2323/08* (2013.01); *C08L 23/0815* (2013.01); *C08L 2203/16* (2013.01); *C08L 2314/06* (2013.01)

(58) Field of Classification Search
CPC ................ C08L 23/0815; C08F 210/16; C08F 4/65904; C08F 4/65927; C08F 4/65925; B32B 27/327
See application file for complete search history.

(56) References Cited

U.S. PATENT DOCUMENTS

| | | | |
|---|---|---|---|
| 6,180,736 B1 | 1/2001 | Muhle et al. | |
| 6,875,828 B2 | 4/2005 | Kuo et al. | |
| 7,256,239 B2 | 8/2007 | Helland et al. | |
| 7,504,055 B2 | 3/2009 | Kwalk | |
| 7,576,166 B2 | 8/2009 | Aarila et al. | |
| 9,371,441 B2 | 6/2016 | Wang et al. | |
| 2013/0029125 A1 | 1/2013 | Tse et al. | ....... 428/220 |
| 2013/0167486 A1 | 7/2013 | Aarnio et al. | |
| 2018/0118860 A1 | 5/2018 | Ye et al. | ....... C08F 210/16 |

FOREIGN PATENT DOCUMENTS

| | | |
|---|---|---|
| KR | 101288500 B | 7/2013 |
| KR | 101485566 B | 1/2015 |
| WO | 2012/044291 A | 4/2012 |
| WO | 2014/099307 A | 6/2014 |
| WO | 2015/123164 A | 8/2015 |

OTHER PUBLICATIONS

Amsharov, K., et al. "Towards the Isomer-Specific Synthesis of Higher Fullerences and Buckybowls by the Surface-Catalyzed Cyclodehydrogenation of Aromatic Precursors" Angew. Chem. Int. Ed., vol. 49, Issue 49, pp. 9393-9396, 2010.

*Primary Examiner* — Caixia Lu
(74) *Attorney, Agent, or Firm* — Stephen A. Baehl (57) ABSTRACT

A polyethylene useful for a film including ethylene derived units and within a range from 0.5 to 20 wt % of C3 to C12 α-olefin derived units, an $I_2$ value within a range from 0.5 to 20 g/10 min, an $I_{21}$ value within a range from 5 to 100 g/10 min, the polyethylene formed from a process comprising combining a bridged bis-cyclopentadienyl Group 4 metal catalyst, an unbridged bis-cyclopentadienyl Group 4 metal catalyst, and an activator with ethylene and within a range from 0.1 to 5 wt %, relative to the weight of all monomers, of a C3 to C12 α-olefin at a temperature within a range from 60 to 100° C.

23 Claims, 4 Drawing Sheets

BROAD ORTHOGONAL DISTRIBUTION METALLOCENE POLYETHYLENES FOR FILMS

CROSS REFERENCE TO RELATED APPLICATIONS

This application claims the benefit of Ser. No. 62/430,105, filed Dec. 5, 2016 and European Application No. 17152326.9, filed Jan. 20, 2017, the disclosures of which are incorporated herein by their reference in their entireties.

FIELD OF THE INVENTION

The present disclosure relates to polyethylenes useful for films and in particular to films made from polyethylenes that have a complex multi-modality in molecular weight and short-chain branching distribution desirable for blown films.

BACKGROUND

A trade-off exists among various performance attributes that has been a major hurdle in the development of new polyethylene product technologies. Among such performance attributes are a combination of stiffness, toughness, processability and optical properties, all of which are important for most of linear low density polyethylene (LLDPE) film applications. However, it is difficult to achieve all of these attributes in one composition; improving toughness often reduces processability, increasing stiffness may cause optical properties to suffer. It is believed that such trade-offs in performance attributes can be significantly overcome by careful tailoring of molecular weight and comonomer distribution in the product. The inventors here have taken the approach to develop a unique polyethylene design via mixed-catalyst systems and proper screening of the product therefrom. More specifically, what has been found is that the use of two metallocene catalysts aimed at the so-called broad orthogonal composition (or comonomer) distribution (BOCD) space—the combination of low weight average molecular weight (Mw) and low short chain branching (SCB) (high density) population of polyethylene chains with high Mw and high SCB (low density) population—achieves the best combination of desirable performance attributes.

Background references include WO 2014/099307, WO 2015/123164, U.S. Pat. Nos. 6,875,828; 7,256,239; 7,504,055; 7,576,166; 9,371,441; US 2013/167486; EP 2 621 969 A, KR 101485566 B1, and KR 101288500 B1.

SUMMARY

Disclosed is a polyethylene comprising (or consisting of, or consisting essentially of) ethylene derived units and within a range from 0.5 to 20 wt % of C3 to C12 α-olefin derived units by weight of the polyethylene; the polyethylene having a density of less than 0.94 or 0.93 g/cm³, an $I_2$ value within a range from 0.5 to 20 g/10 min; and having an $I_{21}$ value within a range from 5 to 100 g/10 min; wherein the polyethylene fractions elute from a temperature-gradient gel permeation chromatographic column at a gradient of temperatures and molecular weights, where 50 wt % or less of the cumulative molecular weight polyethylene fractions elute at a temperatures $T_{w1}$, and greater than 50 wt % cumulative molecular weight polyethylene fractions elute at a temperature $T_{w2}$, the molecular weight fractions eluting at $T_{w1}$ being a molecular weight component $M_{w1}$ and the fractions eluting at $T_{w2}$ being a molecular weight component $M_{w2}$; wherein the $M_{w1}/M_{w2}$ value of the polyethylene is at least 0.9 measured at a $T_{w1}$-$T_{w2}$ value within a range from −16 to −36° C.

Also disclosed is a film comprising (or consisting of, or consisting essentially of) the polyethylene described herein, having a Dart Drop value of at least 500 g/mil, and a Gloss (MD or TD) of at least 40%.

Also disclosed herein is a process to form the polyethylene described herein comprising (or consisting of, or consisting essentially of) combining a bridged bis-cyclopentadienyl Group 4 metal catalyst, an unbridged bis-cyclopentadienyl Group 4 metal catalyst, and an activator with ethylene and within a range from 0.1 to 5 wt % (relative to the weight of all monomers) of a C3 to C12 α-olefin at a temperature within a range from 60 to 100° C., wherein the bridged bis-cyclopentadienyl Group 4 metal catalyst is selected from catalysts represented by the following formula:

where M is a Group 4 metal, each $R^1$ to $R^8$ are independently selected from C1 to C20 alkoxides, or C1 to C20 substituted or unsubstituted alkyl groups; provided that at least one of $R^1$, $R^2$, $R^3$, $R^4$, $R^6$, $R^7$, $R^8$ is a linear C3 to C10 substituted or unsubstituted alkyl group, wherein any two of $R^1$ or $R^2$ and/or $R^7$ and $R^8$ can form an aromatic ring comprising 5 to 7 carbons; T is a bridging group; and each X is, independently, a univalent anionic ligand, or two X are joined and bound to the metal atom to form a metallocycle ring, or two X are joined to form a chelating ligand, a diene ligand, or an alkylidene ligand.

DETAILED DESCRIPTION

The lower density BOCD-type polyethylenes described herein were achieved by providing a polyethylene that is multimodal in molecular weight and short chain branching. This is accomplished by the use of a combined catalyst system wherein a poor-comonomer incorporating catalyst is combined with a high-comonomer incorporating catalyst in a gas phase process to produce the multimodal polyethylene having the desired BOCD. Such polyethylenes are highly useful in forming films such as cast or blown films, especially blown films formed by melt extrusion of the polyethylene into a sheet or cylindrical/tubular form and exposed to positive air pressure against the forming film to expand the sheet in the transverse and machine directions (TD and MD), with or without some machine direction (MD) tension, stretching the material before or during cooling. The inventive polyethylenes are also useful in extrusion coating applications.

As used herein, the term "film" refers to a continuous, flat, preferably flexible, polymeric structure having an average thickness within a range from 0.1, or 1, or 10, or 15 µm to 40, or 60, or 100, or 200, or 250 µm, or such a coating of similar thickness adhered to a flexible, non-flexible or otherwise solid structure. The "film" may comprise (or consist of) one layer, or multiple layers, each of which may comprise (or consist of, or consist essentially of) the inventive polyethylene. For example, one or more layers of a "film" may include a mixture of the polyethylene as well as a LDPE, another LLDPE, polypropylene homo- and copolymers, or a plastomer (high comonomer polyethylene). Desirable uses for such films include labeling and packaging applications, desirably stretch and cling films for wrapping around articles of commerce.

The polyethylene and the method of making it will be described further below, and all references to measurable quantities were measured according to the "Test Method" description or as set forth in the "Examples" section herein.

Polyethylene

In any embodiment is provided a polyethylene comprising (or consisting of, or consisting essentially of) ethylene derived units and within a range from 0.5 to 10, or 15, or 20 wt % of C3 to C12 α-olefin derived units by weight of the polyethylene, and having a density of less than 0.94, or 0.93 g/cm$^3$, an $I_2$ value within a range from 0.5 to 2, or 4, or 6, or 12, or 20 g/10 min (ASTM D1238, 2.16 kg, 190° C.), and an $I_{21}$ value within a range from 5, or 8 to 20, or 30, or 40, or 60, or 80, or 100 g/10 min (ASTM D1238, 21.6 kg, 190° C.); wherein a gradient of polyethylene fractions elutes from a temperature-gradient gel permeation chromatographic column (measured by GPC and CFC techniques described below) at a gradient of temperatures, where 50 wt % or less of the cumulative molecular weight polyethylene fractions elute at a temperature $T_{w1}$, and greater than 50 wt % cumulative molecular weight polyethylene fractions elute at a temperature $T_{w2}$, the molecular weight fractions eluting at $T_{w1}$ being a molecular weight component $M_{w1}$, and the fractions eluting at $T_{w2}$ being a molecular weight component $M_{w2}$; wherein the $M_{W1}/M_{W2}$ value of the polyethylene is at least 0.9, or at least 1, or within a range from 0.9, or 1.5 to 3, or 4, or 5, or 8, or 10, all measured at a $T_{W1}-T_{W2}$ value within a range from −16, or −18 to −30, or −34, or −36° C. The relationship between Mw values and Tw values is expressed in Equations (2) and (3), and the description, further herein.

In any embodiment, the polyethylene has an $M_{w1}$ value of greater than 150,000, or 170,000 g/mole, or within a range from 150,000, or 170,000 g/mole to 250,000 g/mole, or 280,000 g/mole, or 300,000 g/mole, or 350,000 g/mole, or 400,000 g/mole. In any embodiment, the polyethylene of any one of the previous claims has an $M_{w2}$ value is less than 150,000, or 130,000, or 120,000 g/mole, or within a range from 60,000, or 80,000 g/mole to 120,000, or 130,000 g/mole, or 140,000 g/mole. In any embodiment, the polyethylene's multi-modality can be quantified whereby there is a difference of at least 50,000, or 80,000 g/mole in the weight average molecular weight (Mw) of the components, or a difference within the range from 50,000, or 80,000 g/mole to 100,000, or 120,000, or 160,000 g/mole. In any embodiment, both the high and low Mw components have, individually, an MWD (Mw/Mn, Mn being the number average molecular weight) within a range from 1.8, or 2 to 3.5, or 4, or 4.5, or 5.

In any embodiment, the polyethylene has a level of short-chain branching on the $M_{w2}$ fractions that is greater than that for the $M_{w1}$ fractions. This is referred to sometimes in the art as having BOCD. As described herein this is characterized in any embodiment, where cross-fractionation chromatography (CFC) is performed such that polyethylene fractions elute from a temperature-gradient gel permeation chromatographic column at a gradient of temperatures and molecular weights, where 50 wt % or less of the cumulative molecular weight polyethylene fractions elute at a temperature $T_{w1}$, and greater than 50 wt % cumulative molecular weight polyethylene fractions elute at a temperature $T_{w2}$, the molecular weight fractions eluting at $T_{w1}$ being a molecular weight component $M_{w1}$ and the fractions eluting at $T_{w2}$ being a molecular weight component $M_{w2}$; wherein the $M_{W1}/M_{W2}$ value of the polyethylene is at least 0.9, or at least 1, or within a range from 0.9, or 1.5 to 3, or 4, or 5, or 8, or 10 measured at a $T_{W1}-T_{W2}$ value within a range from −16, or −18 to −30, or −34, or −36° C.

In any embodiment, the polyethylene has an overall Mw as measured by gel-permeation chromatography (GPC-4D) within the range from 100,000, or 120,000 g/mole to 140,000, or 160,000, or 200,000 g/mole; and an Mn value within the range from 8,000, or 10,000 g/mole to 30,000, or 36,000 g/mole; and a z-average molecular weight (Mz) within the range from 200,000, or 220,000 g/mole to 260,000, or 300,000, or 340,000 g/mole. In any embodiment the overall Mw/Mn (MWD) of the polyethylene is within the range from 3, or 4 to 5, or 6, or 8, or 10 or 12, or 16, or 20, or 30, where an exemplary MWD range is within the range from 3 to 10. The overall Mz/Mw value is within a range from 2, or 2.2, or 2.4 to 2.8, or 3, or 3.5.

The polyethylenes have other features as well, including a desirable level of both internal (along the polymer chain) and terminal carbon-carbon double bonds or "unsaturations". In any embodiment, the polyethylene has a total number of internal unsaturations, as measured by NMR described below, within a range from 0.1, or 0.2 per 1000 carbons to 0.5, or 0.6, or 0.8 per 1000 carbons. In any embodiment, the polyethylene has a total number of terminal unsaturations, such as vinyl- or vinylidene-group, within a range from 0.001, or 0.01 per 1000 carbons to 0.15, or 0.2, or 0.3, or 0.4 per 1000 carbons. The total level of unsaturation in any embodiment is within a range from 0.5, or 0.6 to 0.8, or 1, or 1.2 per 1000 carbon.

In any embodiment, the polyethylene has an $I_{21}/I_2$ ratio within a range from 18, or 20 to 30, or 35 or 40, or 80.

As stated above, the polyethylenes have in any embodiment a density of less than 0.94, or 0.93 g/cm$^3$ (ASTM 1505, as described below); and in any embodiment, the polyethylene may have a density within a range from 0.91, or 0.915 to 0.92, or 0.925, or 0.93, or 0.94 g/cm$^3$. Also, in any embodiment, the polyethylene has a percent (%) crystallinity by DSC of 40% or greater, or within a range from 40% to 48%, or 50%, or 52%; or a % crystallinity of 46 or greater by GDC, or within a range from 46% to 56%, or 60%, both DSC and GDC methods described further below.

The polyethylene's hot tack performance is desirable. This is indicated in part by a measure of the "Temperature at 70% Cumulative Heat Flow", which is an estimate of the Hot Tack Temperature (° C.) of a film made from the polyethylene. In any embodiment, the Temperature at 70% Cumulative Heat Flow, which is determined by DSC as described below, is 117, or 118, or 119° C. and greater, or within a range from 117, or 118, or 119° C. to 128, or 130° C.

In any embodiment, the polyethylene is formed by a process comprising combining a bridged bis-cyclopentadienyl Group 4 metal (preferably zirconium or hafnium) catalyst, an unbridged bis-cyclopentadienyl Group 4 metal catalyst, and an activator with ethylene and within a range from 0.1 to 5 wt % (relative to the weight of all monomers) of a C3 to C12 α-olefin at a temperature within a range from 60 to 100° C., wherein at least the activator and one of the catalysts is supported, most preferably all three are supported by a solid support material. This is described further below.

Process to Make Polyethylene

In any embodiment is a process to form the polyethylene comprising (or consisting of, or consisting essentially of) combining a bridged bis-cyclopentadienyl Group 4 metal catalyst, an unbridged bis-cyclopentadienyl Group 4 metal catalyst, and an activator with ethylene and within a range from 0.1 to 5 wt %, or 0.01 to 1, or 1.5, or 2 mole % (relative to the weight/moles of all monomers) of a C3 to C8, or C10, or C12 α-olefin (preferably 1-butene, 1-hexene, and/or 1-octene) at a temperature within a range from 60, or 50 to 80° C., or 100° C., wherein the bridged bis-cyclopentadienyl Group 4 metal catalyst is selected from catalysts represented by the following formula:

where M is a Group 4 (of the Periodic Table of Elements) metal, preferably zirconium or hafnium, and each $R^1$ to $R^8$ are independently selected from C1 to C8, or C10, or C20 alkoxides, or C1 to C8, or C10, or C20 substituted or unsubstituted alkyl groups; provided that at least one of $R^1$, $R^2$, $R^3$, $R^4$, $R^6$, $R^7$, $R^8$ is a linear C3 to C6, or C10 substituted or unsubstituted alkyl group, wherein any two of $R^1$ or $R^2$ and/or $R^7$ and $R^8$ can form an aromatic ring comprising 5 to 7 carbons, preferably forming an indenyl ring with the cyclopentadienyl;

T is a bridging group, preferably a di-substituted carbon or silicon, most preferably a di-substituted silyl group such as di-phenyl or di-C1 to C4, or C6, or C10 alkyl; and each X is, independently, a univalent anionic ligand, or two X are joined and bound to the metal atom to form a metallocycle ring, or two X are joined to form a chelating ligand, a diene ligand, or an alkylidene ligand; preferably each X is a halogen, most preferably a chloride of fluoride, or a C1 to C5, or C10 alkyl group, most preferably methyl.

In any embodiment, the bridged bis-cyclopentadienyl hafnocene catalyst is selected from structures above wherein "T" is a di-C1 to C5 alkyl or di-phenyl substituted silyl group and each of $R^1$ to $R^8$ is independently a C1 to C5 alkyl.

The "unbridged bis-cyclopentadienyl Group 4 metal catalyst" can be any bis-cyclopentadienyl Group 4 metal compound, preferably zirconium or hafnium, most preferably zirconium. Each cyclopentadienyl can be substituted in any one, two, three or more positions along the ring with C1 to C6, or C8, or C10 alkyl or alkoxy groups. As in the bridged compound above, the unbridged bis-cyclopentadienyl Group 4 metal catalyst comprises one, two or more "X" groups as defined above.

Also in any embodiment, either one or both of the cyclopentadienyl groups in either the bridged or unbridged catalyst can be an indenyl, fluorenyl, or tetrahydroindenyl group.

The two "metallocene" catalysts used in the inventive process can be used in any ratio with respect to one another. In any embodiment, the bridged bis-cyclopentadienyl Group 4 metal (preferably zirconium or hafnium) catalyst is present within a range from 50, or 60 to 75 wt %, or 85 wt % by weight of the two catalysts, and the unbridged bis-cyclopentadienyl Group 4 metal catalyst is present within a range from 50, or 40 to 25 wt %, or 15 wt % by weight of the two catalysts.

In any embodiment, the metallocene catalysts also comprise (or consists essentially of, or consists of) an activator. In other embodiments, the activator is contacted with the catalyst prior to entering the polymerization reactor or concurrently while the catalyst is in the polymerization reactor being contacted by olefin monomers. In any embodiment, the "activator" comprises any compound capable of converting the catalyst precursor into an active polymerization catalyst, and preferably includes alkyl alumoxane compounds (e.g., methylalumoxane) and/or tetra (perfluorinated aromatic)borates, but more preferably comprises tetra(perfluorinated aromatic)borates. Even more preferably, the activator comprises anions selected from tetra(pentafluorophenyl)borate, tetra(perfluorobiphenyl)borate, tetra(perfluoronaphthyl)borate, and combinations thereof. In the case of anionic activators, the activator also comprises a bulky organic cation (trialkyl ammonium, trialkylmethyl), preferably dialkylanilinium cation, or triphenylmethyl cation. Most preferably the activator is an alumoxane compound, preferably supported on a solid support. In any embodiment, the supported catalyst consists essentially of (or consists of) the support, activator, and at least one of the catalysts disclosed herein, preferably both catalysts and the activator.

As mentioned, the heterogeneous catalysts and activator are "associated with" an insoluble, solid support material, meaning that the catalyst and/or activator may be chemically bound to, or physically absorbed onto and/or in the support. In any embodiment, the support is selected from the group consisting of Groups 2, 4, 13, and 14 metal oxides and mixtures thereof. Preferably the support is selected from the group consisting of silica, alumina, magnesia, titania, zirconia, and the like, and mixtures thereof and is most preferably silica. Regardless of the chemical identity of the support, in any embodiment, the support has an average surface area of from 200, or 400 to 800, or 1000, or 1200, or 1400 m²/g.

The support preferably comprises silica, for example, amorphous silica, which may include a hydrated surface presenting hydroxyl or other groups which can be deprotonated to form reactive sites to anchor activators and/or catalyst precursors. Other porous support materials may optionally be present with the silica as a co-support, for example, talc, other inorganic oxides, zeolites, clays, organoclays, or any other organic or inorganic support material and the like, or mixtures thereof. Silicas that may be suitable are commercially available under the trade designations PD 14024 (PQ Corporation), D70-120A (Asahi Glass Co., Ltd. or AGC Chemicals Americas, Inc.), and the like.

When a silica support is referred to herein, the silica support (in unaltered form) comprises at least 60 wt %, 70 wt %, 80 wt %, 90 wt %, 95 wt %, 98 wt %, or 99 wt % or more of silica. The silica support may comprise up to 5 wt %, 10 wt %, 20 wt %, 30 wt %, or 40 wt % of another compound. The other compound may be any other support material discussed herein. The other compound may be a titanium, aluminum, boron, magnesium, or mixtures thereof. Additionally, the other compound may be a talc, other inorganic oxide, zeolite, clay, organoclay, or mixtures thereof. The silica support may also not include any substantial amount of any other compound, that is, the silica support may comprise less than 5 wt %, 1 wt %, 0.5 wt %, 0.2 wt %, or less of any other compound.

The support is preferably dry, that is, free of absorbed water. Drying of the support may be effected by heating or calcining to at least 130° C., or preferably within a range from 130 to 850° C., or 200 to 600° C., for a time of 1 minute to 100 hours, or more preferably from 12 hours to 72 hours, or from 24 hours to 60 hours. The calcined support material may comprise at least some groups reactive with an organometallic compound, for example, reactive hydroxyl (OH) groups to produce the supported catalyst systems of this invention.

The polyethylene can be produced in any known process such as a slurry (in solution) process, such as in so-called "loop" reactors that are well known in the art, or in a gas phase reactor, especially a fluidized bed gas phase reactor wherein monomer and other gases are recirculated through a bed of polymer. Most preferably the polyethylene is produced in a gas phase process at a gas velocity of at least 2, or 3, or 4 ft/s. Such processes are well known in the art and the process for making the polyethylene is not otherwise particularly limited.

In any embodiment, the polyethylene is produced in a single-reactor process, wherein the monomers contact the catalysts in only one reactor to produce the polyethylene, or a dual-reactor process where the monomers contact the catalysts in two or more reactors in parallel or series, but most preferably a single-reactor process.

Film

In any embodiment, is a film comprising (or consisting of, or consisting essentially of) the polyethylene of any one of the previous claims; having a Dart Drop value of at least 500, or 550, or 600 g/mil, or within a range from 500, or 550, or 600 to 700 g/mil, or 800 g/mil or 1000 g/mil, and a Gloss (MD or TD) of at least 40, or 45%, or within a range from 40, or 45 to 60, or 80%. The film can be formed by any known process, but is preferably formed by "blowing" in a blown film process. The final film may be a single layer film comprising the polyethylene as a blend with other polymers, especially other polyolefins, or consisting essentially of the polyethylene and common additives such as antioxidants, fillers, etc. The film may also comprise two, three, four, five or more layers where any one or more of the layers may comprise or consist essentially of the polyethylene. When a layer of the film comprises polyethylene, it may be as a blend with other polyolefins such as low density polyethylene, linear low density polyethylene, high density polyethylene, polypropylene homopolymer, polypropylene copolymer, and combinations thereof.

In a typical process, the polyethylene melt is extruded through a die such as an annular slit die, usually vertically, to form a thin walled tube. Cooling, preferably in the form of positive air pressure, is introduced via a device in the center of the die to blow up the tube like a balloon. Cooling can also be effectuated or assisted by other means such as external (to the film) devices, and the air may be nitrogen/oxygen or other gases or mixtures of gases or liquids. For instance, mounted on top of the die, a high-speed air ring blows onto the exterior of the hot film to cool it. The cooling may occur at some adjustable distance from the die, which is typically at least 1 cm from the die from which the melt extrudes. The tube of film can then continue upwards or away from the die in a "machine direction", continually cooling, until it may pass through nip rolls where the tube is flattened to create what is known as a "lay-flat" tube of film. This lay-flat or collapsed tube can then be taken back down the extrusion "tower" via more rollers. On higher output lines, the air inside the bubble is also exchanged. This is known as IBC (Internal Bubble Cooling).

More particularly in the blown film process the ingredients used to form the film are added in any desirable form, preferably as granules, in a hopper which feeds the material to one or more extruders where the materials are melt blended at a desirable temperature through shear forces and/or heating. The molten material is then fed, with or without filtering, to a die which is also heated to a desired temperature such as 180 to 220° C. and then forced from the die in a direction away from the die at least in part by force of blown air. The cooling of the forming film takes place as the film moves away from the die, and preferably a high-speed air ring that blows air that is at least 10 or 20° C. cooler than the surrounding air facilitates that cooling. Preferably the surrounding temperature in the area of the forming film is within a range from 20° C., or 30 to 50° C., or 60° C. Most preferably the forming film is cylindrical and the air ring forms a ring round the cooling tube that blows air concentrically around the film. The air preferably blows against the outside of the film, most preferably around the entire circumference formed by the film. The distance of the device from the die opening can be made to vary to allow a "relaxation time" for the hot film to gradually cool prior to being exposed to the cooling air from the cooling device. There is also air blown internally that both cools and blows the film up like a balloon. The film starts to expand where it eventually cools and crystallizes to form finished blow film where the finished film is eventually isolated by various means such as by rollers, nips, etc.

The lay-flat film is then either kept as such or the edges of the lay-flat are slit off to produce two flat film sheets and wound up onto reels. Articles such as bags can be made from such lay-flat films. In this regard, if kept as lay-flat, the tube of film is made into bags by sealing across the width of film and cutting or perforating to make each bag. This is performed either in line with the blown film process or at a later stage.

Preferably, the expansion ratio between the die and blown tube of film would be 1.5 to 4 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film which is drawn down along the extrusion direction only.

Preferably, the die used in the formation of the films herein is designed such that the die opening, through which the molten polyolefin extrudes, is in the form of a ring and the molten polyolefin emanating therefrom is in the form of a continuous tube. The Die Factor Rate at which the film is formed is within a range from 10 lb/in-hr, or 15 to 20 lb/in-hr, or 26 lb/in-hr, or 30 lb/in-hr, or 40 lb/in-hr (0.56 kg/mm-hr, or 0.84 to 1.12 kg/mm-hr, or 1.46 kg/mm-hr, or 1.69 kg/mm-hr, or 2.25 kg/mm-hr); and preferably the Maximum Rate of extrusion is within a range from 350 lb/hr (159 kg/hr) to 500 lb/hr (227 kg/hr). Note that for the "Die Factor" there is one more difference besides the units. In the English unit, the die dimension is the die circumference, while in the metric unit, the die dimension is the die diameter.

The inventive film, most preferably a monolayer film comprising or consisting essentially of the polyethylene, will have many desirable properties. In any embodiment, the film has an average thickness within a range from 10, or 15 µm to 40, or 60, or 80, or 100 µm, most preferably from 15 to 40 µm. In any embodiment, the film has a Seal Initiation Temperature (measured as described below) at 1N force (° C.) within a range from 80° C., or 85° C. to 105° C., or 110° C., or 115° C. In any embodiment, the film has a Maximum Hot Tack Force (measured as described below) of greater than 10, or 12, or 13 N, or within a range from 10, or 12, or 13 N to 18, or 20 N. In any embodiment, the film has a MD Tensile Strength within a range from 7800 psi to 8,000, or 10,000 psi; and a TD Tensile Strength within a range from 6500 psi to 6500, or 8500 psi. In any embodiment, the film has an MD Elongation at Break within a range from 350 to 500%, or 600%, and a TD Elongation at Break within a range from 450 to 800%. In any embodiment, the film has an MD Elmendorf Tear within a range from 100 to 200 g, or 250, or 300 g, and a TD Elmendorf Tear within a range from 350 to 650 g. In any embodiment, the film has an MD 1% Secant Flexural Modulus within a range from 25 to 35 kpsi, or 40 kpsi, or 50 kpsi, and a TD 1% Secant Flexural Modulus within a range from 20 to 50 kpsi, or 60 kpsi, or 70 kpsi.

When referring to a polyethylene or polyethylene film herein, in any embodiment when the phrase "consists essentially of" is used that means that the polyethylene, or film made of the polyethylene, includes less than 5, or 4, or 3, or 2, or 1 wt %, by weight of the polyethylene, or additives as are known in the art, such as fillers, colorants, antioxidants, anti-UV additives, curatives and cross-linking agents, aliphatic and/or cyclic containing oligomers or polymers, often referred to as hydrocarbon polyethylenes, and other additives well known in the art, and other common additives such as disclosed in WO 2009/007265.

EXAMPLES

Described herein are exemplary polyethylenes produced by the methods outlined above. The various descriptive elements and numerical ranges disclosed herein for the polyethylenes, processes and films can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples. The testing methods used to test the polymers and films made therefrom are also described.

Test Methods

| Test Name | Method or description |
|---|---|
| Melt Index ($I_2$), High Load Melt Index ($I_{21}$) | ASTM D-1238 2.16 kg (MI) or 21.6 kg (HLMI), 190° C. |
| Density | ASTM D1505, column density. Samples were molded under ASTM D4703-10a, Procedure C, then conditioned under ASTM D618-08 (23° ± 2° C. and 50 ± 10% relative humidity) for 40 hours before testing |
| 1% Secant Modulus | ASTM D-882, 15 mm width strip |
| Yield Strength | ASTM D-882, 15 mm width strip |
| Tensile Strength | ASTM D-882, 15 mm width strip |
| Elongation at Break | ASTM D-882, 15 mm width strip |
| Elongation at Yield | ASTM D-882, 15 mm width strip |
| Dart Drop | ASTM D-1709, Phenolic, Method A |
| Haze | ASTM D-1003 |
| Gloss, 45° | ASTM D-2457 |
| Elmendorf Tear | ASTM D1922 with conditioning for 40 hours at 23° ± 2° C. and 50 ± 10% relative humidity |
| Puncture | Modified ASTM D5748: ASTM probe was used with two 0.25 mil HDPE slip sheets. Machine Model: United SFM-1. Testing speed: 10 in/min |
| $^1$NMR | Unsaturations in a polymer were determined by $^1$H NMR with reference to 38 MACROMOLECULES 6988 (2005), and 47 MACROMOLECULES 3782 (2014) (see $^1$H NMR description below) |
| Heat Seal | Method using 1 inch film strip of 1 mil gauge, sealed at various temperatures under 73 psi (0.5 N/mm$^2$) for 1 second. Following ASTM conditioning for 40 hours at 23° ± 2° C. and 50 ± 10% relative humidity, the sealed specimen were tested in T-joint peel mode at 20 inch/min pulling speed |
| Hot tack | Method using 1 inch film strip of 1 mil gauge, sealed at various temperatures under 73 psi (0.5 N/mm$^2$) for 0.5 second. After a 0.4 second delay, the sealed specimen were pulled at 200 mm/speed in T-joint peel mode |
| Molecular weights and cross-fractionation | GPC-4D and CFC, described below |
| Total defect area of a film (TDA) | Described below |
| DSC and GDC | Described below |

Supported Catalyst Preparations

The catalysts precursors used in the examples that generated the exemplary polyethylenes are as follows, and the ratios in which they are combined are weight ratios:

C1=Rac/meso Me$_2$Si(3-nPrCp)$_2$HfMe$_2$
C2=Rac/meso (1-EtInd)$_2$ZrMe$_2$
C3=Rac/meso (1-MeInd)$_2$ZrMe$_2$
C4=Rac/meso (Me$_5$Cp)(1-MeInd)ZrMe$_2$ C1/C2 (80:20): To a stirred vessel 1400 g of toluene was added along with 925 g of methylaluminoxane (30 wt % in toluene). To this solution 734 g of ES70-875° C. calcined silica (Purchased from PQ Corporation and calcined to 875° C. before use) was added. The reactor contents were stirred for three hours at 100° C. The temperature was then reduced and the reaction was allowed to cool to ambient temperature. Dimethylsilyl(n-propylcyclopentadienide) hafnium dimethyl (11.50 g, 24.00 mmol) and bis-ethylindenyl zirconium (IV) dimethyl (2.45 g, 6.00 mmol) were then dissolved in toluene (250 g) and added to the vessel, which was allowed to stir for two more hours. The mixture was then stirred slowly and dried under vacuum for 60 hours, after which 1019 g of light yellow silica was obtained.

C1/C3 (80:20): To a stirred vessel 1400 g of toluene was added along with 925 g of methylaluminoxane (30 wt % in toluene). To this solution 734 g of ES70-875° C. calcined silica was added. The reactor contents were stirred for three hours at 100° C. The temperature was then reduced and the reaction was allowed to cool to ambient temperature. Dimethylsilyl(n-propylcyclopentadienide) hafnium dimethyl (11.50 g, 24.00 mmol) and bis-methylindenyl zirconium (IV) dimethyl (2.28 g, 6.00 mmol) were then dissolved in toluene (250 g) and added to the vessel, which was allowed to stir for two more hours. The mixture was then stirred slowly and dried under vacuum for 60 hours, after which 1049 g of light yellow silica was obtained.

C1/C4 (70:30): To a stirred vessel 1400 g of toluene was added along with 925 g of methylaluminoxane (30 wt % in toluene). To this solution 734 g of ES70-875° C. calcined silica was added. The reactor contents were stirred for three hours at 100° C. The temperature was then reduced and the reaction was allowed to cool to ambient temperature. Dimethylsilyl(n-propylcyclopentadienide) hafnium (IV) dimethyl (10.06 g, 21.00 mmol) and tetramethylcyclopentadienyl methylindenyl zirconium dimethyl (2.31 g, 6.00 mmol) were then dissolved in toluene (250 g) and added to the vessel, which was allowed to stir for two more hours. The mixture was then stirred slowly and dried under vacuum for 60 hours, after which 998 g of light yellow silica was obtained.

C1/C4 (80:20): To a stirred vessel 1400 g of toluene was added along with 925 g of methylaluminoxane (30 wt % in toluene). To this solution 734 g of ES70-875° C. calcined silica was added. The reactor contents were stirred for three hours at 100° C. The temperature was then reduced and the reaction was allowed to cool to ambient temperature. Dimethylsilyl(n-propylcyclopentadienide) hafnium (IV) dimethyl (11.50 g, 24.00 mmol) and tetramethylcyclopentadienyl methylindenyl zirconium dimethyl (3.47 g, 9.00 mmol) were then dissolved in toluene (250 g) and added to the vessel, which was allowed to stir for two more hours. The mixture was then stirred slowly and dried under vacuum for 60 hours, after which 1027 g of light yellow silica was obtained.

Mixed Catalyst Systems to Produce Polyethylenes

Polymerization was performed in an 18.5 foot tall gas-phase fluidized bed reactor with an 18 inch diameter straight (bed) section. Cycle and feed gases were fed into the reactor body through a perforated distributor plate, and the reactor was controlled at 300 psi and 70 mol % ethylene. Reactor temperature was maintained by heating the cycle gas. The use of different poor comonomer incorporators can be used to alter the properties of the resulting polymer. Using C1 compared to C3 gives a lower MW component, requiring less H$_2$ to make the same target melt index. This is likely the cause of the higher MIR seen in the propylene (C3) system.

The ratio of poor incorporator and good incorporator (the two metallocenes, one bridged and the other un-bridged) can also be used to tune the product properties. Increasing from 20 mol % to 30 mol % C1 paired with C4 resulted in an MIR increase from 21 to 24. The MWD (Mw/Mn) ranged from 3 to 7. Minor adjustments were made in the level of hexene and hydrogen to achieve the desired product, but most importantly, different products were made from each catalyst combination as the ratios were varied.

TABLE 1

Production of polyethylenes using catalyst pairs

| Conditions | C1/C2 (80:20) | C1/C3 (80:20) | C1/C4 (70:30) | C1/C4 (80:20) |
|---|---|---|---|---|
| Temperature (° C.) | 85 | 85 | 85 | 85 |
| Pressure (psi) | 300 | 300 | 300 | 300 |
| Ethylene (mole %) | 70 | 70 | 70 | 69 |
| Hydrogen (ppm) | 430 | 290 | 400 | 440 |
| Hexene (mole %) | 0.97 | 1.12 | 0.90 | 0.80 |
| Bed Weight (lb) | 345 | 316 | 321 | 325 |
| Residence Time (hr) | 4.5 | 4.6 | 5.5 | 4.0 |
| Cycle Gas Velocity (ft/s) | 2.25 | 2.25 | 2.25 | 2.25 |
| Activity ($g_{poly}/g_{supported\ cat}$) | 7800 | 5300 | 4600 | 7100 |
| Polyethylene properties | A | B | C | D |
| I$_2$ (MI, g/10 min) | 1.0 | 1.01 | 1.04 | 1.02 |
| I$_{21}$ (HLMI, g/10 min) | 27.1 | 39.0 | 24.8 | 20.9 |
| I$_{21}$/I$_2$ (MI/HLMI) | 26.6 | 38.6 | 23.8 | 20.5 |
| Density (g/cm$^3$) | 0.9204 | 0.9199 | 0.9211 | 0.9204 |
| wt % hexene-derived units | 8.46 | 9.80 | 7.96 | 7.58 |
| Mn (GPC-4D) | 11,805 | 19,349 | 22,060 | 25,134 |
| Mw (GPC-4D) | 110,775 | 120,152 | 115,465 | 114,866 |
| Mz (GPC-4D) | 274,601 | 323,468 | 271,311 | 263,710 |

TABLE 1-continued

Production of polyethylenes using catalyst pairs

| Conditions | C1/C2 (80:20) | C1/C3 (80:20) | C1/C4 (70:30) | C1/C4 (80:20) |
|---|---|---|---|---|
| Mw/Mn | 9.38 | 6.21 | 5.23 | 4.57 |
| Mz/Mw | 2.48 | 2.69 | 2.35 | 2.30 |

Figure 1:
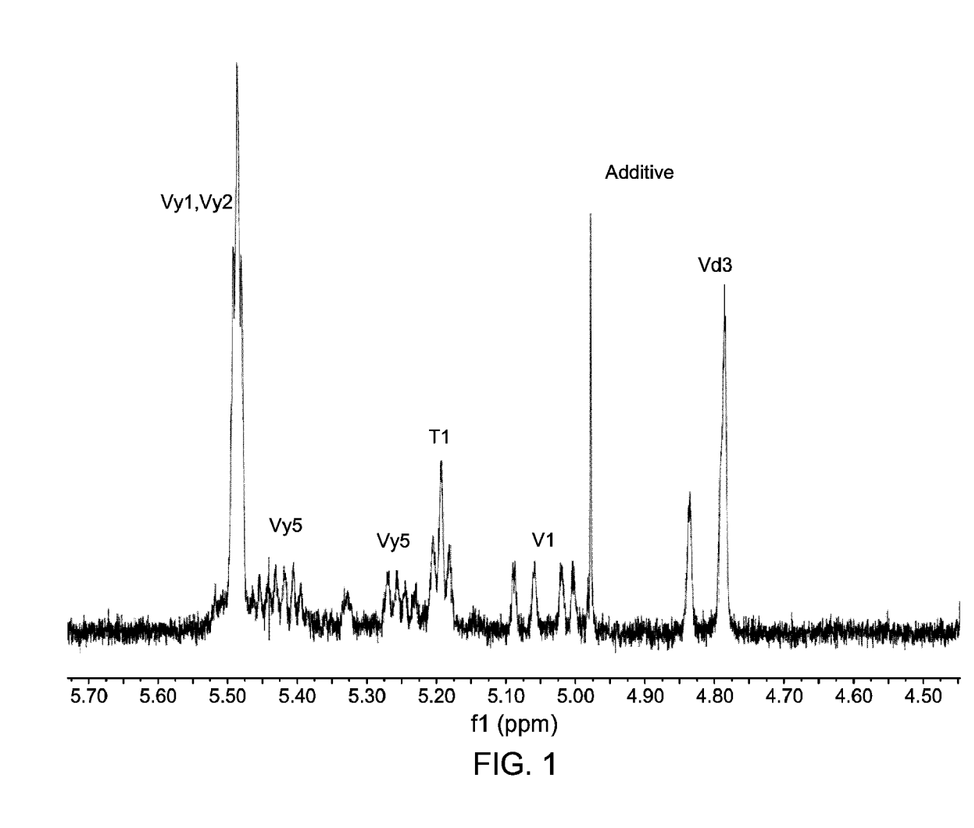
FIG. 1 is an ¹H NMR olefinic analysis of an exemplary polyethylene from gas phase ethylene/hexene polymerization using supported mixed catalyst: Rac/meso Me₂Si(3-nPrCp)₂HfMe₂: (1-EtInd)₂ZrMe₂: Additive: Irganox™ 1010.

Nuclear magnetic resonance measurements of the polyethylenes reveals some unsaturations, as summarized in Table 2. The labels "Vy1", "Vy2" and "Vy5" refer to proton resonances attributed to the protons on double bonds within the polymer backbone, as shown in the example $^1$H NMR of FIG. 1.

TABLE 2

Level of unsaturation (internal (I) and terminal (T)) for polyethylenes

| Types of unsaturation | A | B | C | D |
|---|---|---|---|---|
| | unsaturations per 1000 carbons | | | |
| Vy1 and Vy2 (I) | 0.20 | 0.30 | 0.19 | 0.20 |
| Vy5 (T) | 0.10 | 0.16 | 0.13 | 0.09 |
| Tri-substituted olefins (I) | 0.12 | 0.18 | 0.20 | 0.14 |
| Vinyls (T) | 0.04 | 0.07 | 0.10 | 0.05 |
| Vinylidenes (T) | 0.07 | 0.10 | 0.14 | 0.10 |
| total internal unsaturations | 0.32 | 0.48 | 0.39 | 0.34 |

1H NMR $^1$H NMR data was collected at 393K in a 10 mm probe using a Bruker spectrometer with a $^1$H frequency of at least 400 MHz (available from Agilent Technologies, Santa Clara, Calif.). Data was recorded using a maximum pulse width of 45° C., 5 seconds between pulses and signal averaging 512 transients. Spectral signals were integrated and the number of unsaturation types per 1000 carbons was calculated by multiplying the different groups by 1000 and dividing the result by the total number of carbons. The number average molecular weight (Mn) was calculated by dividing the total number of unsaturated species into 14,000, and has units of g/mol.

Gel Permeation Chromatography (GPC-4D)

The distribution and the moments of molecular weight (Mw, Mn, Mw/Mn, etc.) were determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 mL/min and the nominal injection volume is 200 µL. The whole system including transfer lines, columns, detectors are contained in an oven maintained at 145° C. Given amount of polymer sample is weighed and sealed in a standard vial with 80 µL, flow marker (heptane) added to it. After loading the vial in the auto-sampler, polymer is automatically dissolved in the instrument with 8 mL added TCB solvent. The polymer is dissolved at 160° C. with continuous shaking for about 1 hour for most polyethylene samples or 2 hour for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. Values for Mn are ±2,000 g/mole, for Mw are ± 5,000 g/mole, and Mz are ±50,000 g/mole.

The concentration (c), at each point in the chromatogram is calculated from the baseline-subtracted IR5 broadband signal intensity (I), using the following equation: c=βI, where β is the mass constant determined with polyethylene or polypropylene standards. The mass recovery is calculated from the ratio of the integrated area of the concentration chromatography over elution volume and the injection mass which is equal to the pre-determined concentration multiplied by injection loop volume.

The conventional molecular weight (IR MW) was determined by combining universal calibration relationship with the column calibration which is performed with a series of mono-dispersed polystyrene (PS) standards ranging from 700 to 10,000 kg/mole. The MW at each elution volume is calculated with following equation (1):

$$\log M = \frac{\log(K_{PS}/K)}{a+1} + \frac{a_{PS}+1}{a+1} \log M_{PS}, \quad (1),$$

where the variables with subscript "PS" stands for polystyrene while those without a subscript are for the test samples. In this method, $a_{PS}$=0.67 and $K_{PS}$=0.000175 while α and K are calculated from a series of empirical formula established in ExxonMobil and published in literature (T. Sun, P. Brant, R. R. Chance, and W. W. Graessley, 34(19) MACROMOLECULES 6812-6820, (2001)). Specifically, α/K=0.695/0.000579 for polyethylene and 0.705/0.0002288 for PP. All the concentration is expressed in g/cm$^3$, molecular weight is expressed in g/mole, and intrinsic viscosity is expressed in dL/g unless otherwise noted.

Cross-fractionation Chromatography (CFC)

Cross-fractionation chromatography (CFC), which combines TREF and traditional GPC (TREF/GPC) as disclosed in WO 2015/123164 A1, and described in U.S. Ser. No. 62/350,223 filed on Jun. 15, 2016, was performed on a CFC-2 instrument from Polymer Char, Valencia, Spain on the polyethylenes generated as described above in Table 1. The instrument was operated and subsequent data processing, for example, smoothing parameters, setting baselines, and defining integration limits, was performed according to the manner described in the CFC user manual provided with the instrument or in a manner commonly used in the art. The instrument was equipped with a TREF column (stainless steel, o.d., ⅜"; length, 15 cm; packing, non-porous stainless steel micro-balls) in the first dimension and a GPC column set (3×PLgel 10 µm Mixed B column from Polymer Labs, UK) in the second dimension. Downstream from the GPC column was an infrared detector (IR4 from Polymer Char) capable of generating an absorbance signal that is proportional to the concentration of polymer in solution.

As used throughout the claims and description, such a dual-column system will be referred to generally as a "temperature-gradient gel permeation chromatographic column", as any combination of molecular weight sensitive and temperature sensitive or branching-sensitive separation means can be employed and can include one, two, or more types of separation means such as columns through which dissolved polymer is differentially eluted.

The sample to be analyzed was dissolved in ortho-dichlorobenzene, at a concentration of about 5 mg/ml, by stirring at 150° C. for 75 min. Then a 0.5 ml volume of the solution containing 2.5 mg of polymer was loaded in the center of the TREF column and the column temperature was reduced and stabilized at about 120° C. for 30 min. The column was then cooled slowly (0.2° C./min) to 30° C. (for ambient runs) or −15° C. (for cryogenic runs) to crystallize the polymer on the inert support. The low temperature was held for 10 min before injecting the soluble fraction into the GPC column. All GPC analyses were performed using solvent ortho-dichlorobenzene at 1 ml/min, a column temperature up to 140° C., and in the "Overlap GPC Injections" mode. Then the subsequent higher-temperature fractions were analyzed by increasing the TREF column temperature to the fraction set-points in a stepwise manner, letting the polymer dissolve for 16 min ("Analysis Time"), and injecting the dissolved polymer into the GPC column for 3 min ("Elution Time"). The soluble portion or "purge" of the polymers was not analyzed, only the "insoluble" portion of the polymer samples were analyzed, that is, insoluble at −15° C. or lower.

The universal calibration method was used for determining the molecular mass of eluting polymers. Thirteen narrow molecular-weight distribution polystyrene standards (obtained from Polymer Labs, UK) within a range of 1.5 to 8,200 Kg/mol were used to generate a universal calibration curve. Mark-Houwink parameters were obtained from Appendix I of *Size Exclusion Chromatography* by S. Mori and H. G. Barth (Springer, 1999). For polystyrene K=1.38× $10^{-4}$ dl/g and α=0.7; and for polyethylene K=5.05×$10^{-4}$ dl/g and α=0.693 were used. Fractions having a weight % recovery (as reported by the instrument software) of less than 0.5% were not processed for calculations of molecular-weight averages (Mn, Mw, etc.) of the individual fractions or of aggregates of fractions. Results of CFC measurements are summarized in Table 3, where the "density" in the first column is expressed as "918" for a density of 0.918 g/cm³, and MI and HLMI are expressed as g/10 min).

Determining $T_{w1}$, $T_{w2}$, $M_{w1}$ and $M_{w2}$ from CFC

The procedures for interpreting the data obtained from CFC are discussed in more detail below. Among other information, this techniques helps to elucidate the level of comonomer on high-to-low molecular weight fractions of polyethylenes.

Figure 2:
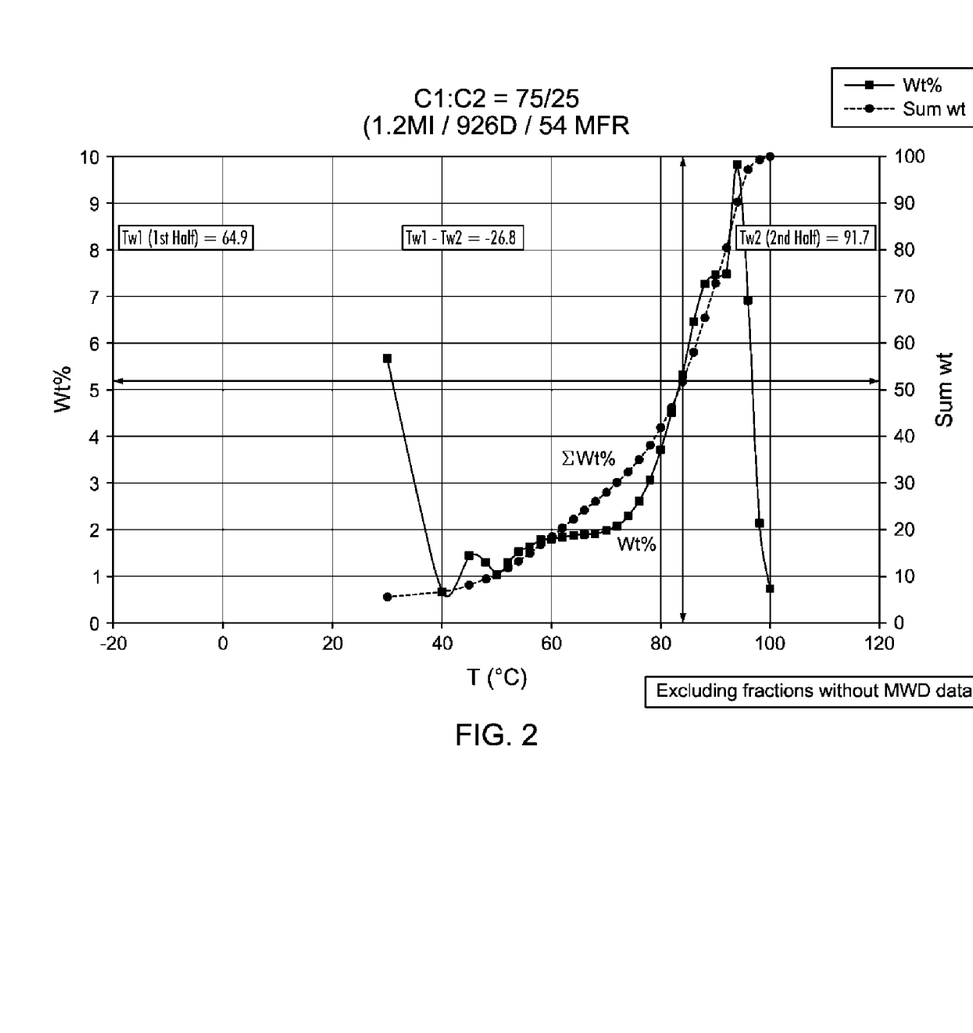
FIG. 2 is a graph of weight percent as a function of temperature of CFC (TREF) data, demonstrating the calculation of $T_{w1}$ and $T_{w2}$ for the same polymer in FIG. 1.
Figure 3:
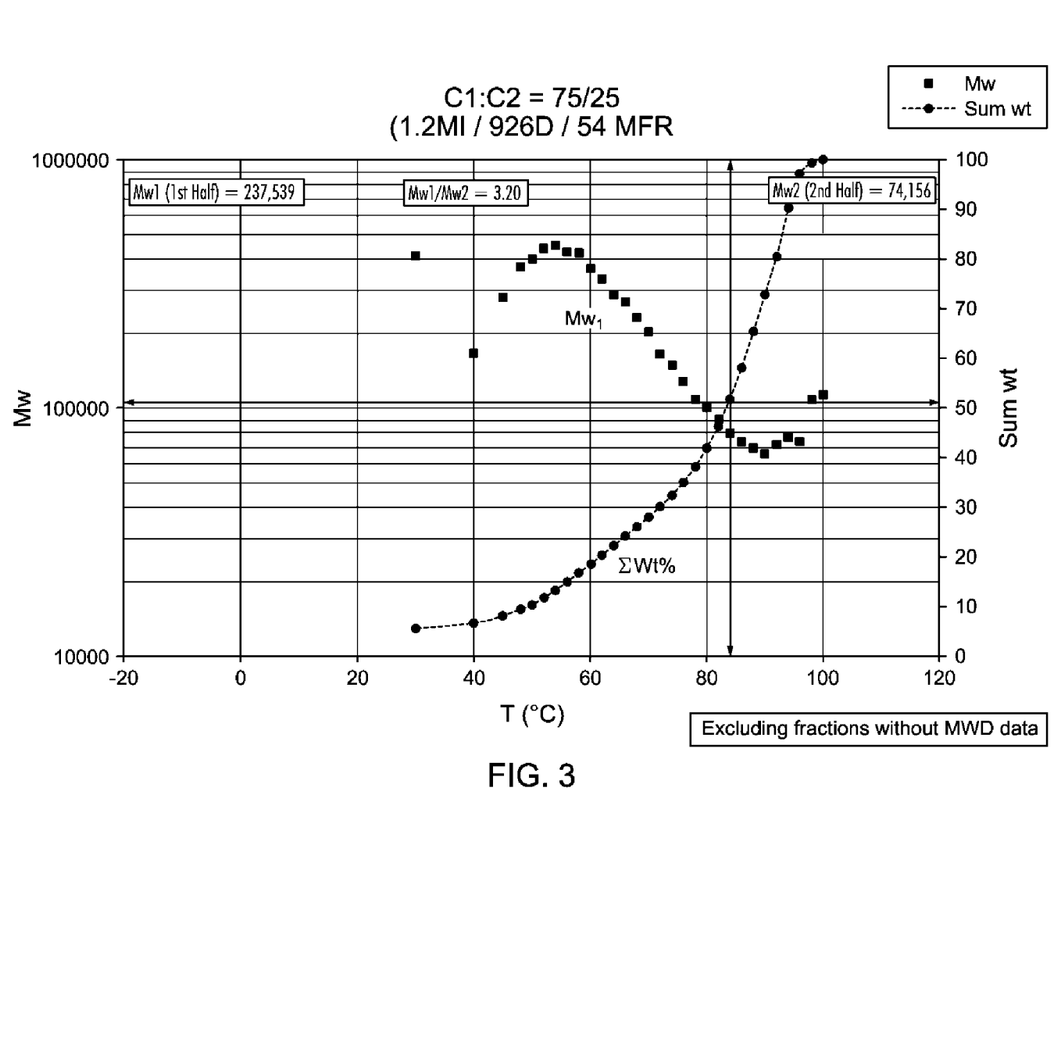
FIG. 3 is a graph of weight average molecular weight as a function of temperature of CFC data, demonstrating the calculation of $M_{w1}$ and $M_{w2}$ for the polymer in FIG. 1.

From the CFC data obtained, each fraction is listed by its fractionation temperature (Ti) along with its normalized weight percent (wt %) value ($W_i$), cumulative weight percent, that is, the sum weight percents in the graphs of FIG. 2 and FIG. 3, and various moments of molecular weight averages (including weight average molecular weight, $M_{wi}$).

FIG. 2 and FIG. 3 are plots that graphically illustrate the calculations used to determine branching within the molecular weight fractions of polyethylenes. In both FIG. 2 and FIG. 3, the x-axis represents the elution temperature in centigrade, while the right hand y-axis represents the value of the integral of the weights of polymer that have been eluted up to an elution temperature. The temperature at which 100% of the material has eluted in this example was about 100° C. The closest point at which 50% of the polymer has eluted was determined by the integral, which was used then to divide each of the plots into a 1st-half and a 2nd-half.

Qualitatively, a gradient of molecular weight fractions of the polyethylene (a gradient based on both molecular weight of individual polymer chains and the level of branching on each chain) elutes from at least one temperature-gradient gel permeation chromatographic column at a gradient of temperatures and molecular weights, where 50 wt % or less of the cumulative molecular weight polyethylene fractions elutes at a temperature $T_{w1}$, and greater than 50 wt % cumulative molecular weight polyethylene fractions elute at a temperature $T_{w2}$, the molecular weight fractions eluting at $T_{w1}$ being a molecular weight component $M_{w1}$ and the fractions eluting at $T_{w2}$ being a molecular weight component $M_{w2}$.

Quantitatively, to calculate values of $T_{w1}$, $T_{w2}$, $M_{w1}$ and $M_{w2}$, the data obtained from fractional CFC was divided into two roughly equal halves. For each half the $T_{wi}$ and $M_{wi}$ for each fraction "i" were calculated according to the conventional definition of weight average. Fractions which did not have sufficient quantity (<0.5 wt %) to be processed for molecular weight averages in the original data file were excluded from the calculation of $T_{w1}$, $T_{w2}$, $M_{w1}$ and $M_{w2}$.

The first part of the process is illustrated by FIG. 2. From the CFC data, the fraction whose cumulative weight percentage (sum weight) is closest to 50% was identified (e.g., the fraction at 84° C. on FIG. 2) of the polyethylenes. The fractional CFC data was divided into two halves, for example, Ti≤84° C. as the 1st half and Ti>84° C. as the 2nd half on FIG. 2. Fractions which do not have molecular weight averages reported in the original data file are excluded, for example, excluding the fractions with Ti between 25° C. and 40° C. on FIG. 2.

In FIG. 2, the left hand y-axis represents the weight percent (wt %) of the eluted fraction. Using the procedure above to divide the curves into two halves, these values are used to calculate the weight average elution temperature for each half using the formula shown in (2):

$$Tw = \frac{\sum Ti\, Wi}{\sum Wi}. \quad (2)$$

In equation (2), Ti represents the elution temperature for each eluted fraction, and Wi represents the normalized weight % (polymer amount) of each eluted fraction. For the example shown in FIG. 2, this provides a weight average elution temperature of 64.9° C. for the first half, and 91.7° C. for the second half In FIG. 3, the left hand axis represents the weight average molecular weight (Mwj) of each eluted fraction. These values are used to calculate the weight average molecular weight for each half using the formula shown in (3):

$$Mw = \frac{\sum Mwi\, Wi}{\sum Wi}. \quad (3)$$

In equation (3), Mw represents the weight average molecular weight of each eluted fraction, and Wi represents the normalized weight % (polymer amount) of each eluted fraction "i". For the example shown in FIG. 3, this provides a weight average molecular weight of 237,539 g/mole for the first half, and 74,156 g/mole for the second half. The values calculated using the techniques described above may be used to classify the MWD and SCBD for experimental polymers and control polymers.

In the plot in FIG. 3, the x-axis represents the value of the difference between the first and second weight average elution temperatures ($T_{w1}-T_{w2}$). The y-axis in a log scale represents the ratio of the first weight average molecular weight to the second weight average molecular weight ($M_{w1}/M_{w2}$). A generalization among various types of polymer compositions as expressed in FIG. 2 and FIG. 3 can be described as follows:

Point at X=0/Y=0: An ideal case of narrow MWD and narrow SCBD. Practically impossible for X=0 due to the forced division along temperature axis into two halves, as shown in FIG. 2 and FIG. 3.

Line of X=0: An ideal case of broadened MWD and narrow SCBD. At X=0, no difference in the direction of moving Y values up or down, that is, broadened MWD while keeping SCBD narrow.

Line of Y=0: A case of broadened SCBD while keeping MWD unchanged and narrow.

Corner with X<0/Y<1: Products where polymer composition characterized by the combination of Low $M_{wt}$/Low Ti (high SCB) molecules with High $M_{wt}$/High Ti (low SCB) molecules; exemplified by conventional LLDPE with ZN-catalyst.

Corner with X<0/Y>1: Products where polymer composition characterized by the combination of Low $M_{wt}$/High Ti (low SCB) molecules with High $M_{wt}$/Low Ti (high SCB) molecules; exemplified by BOCD.

Figure 4:
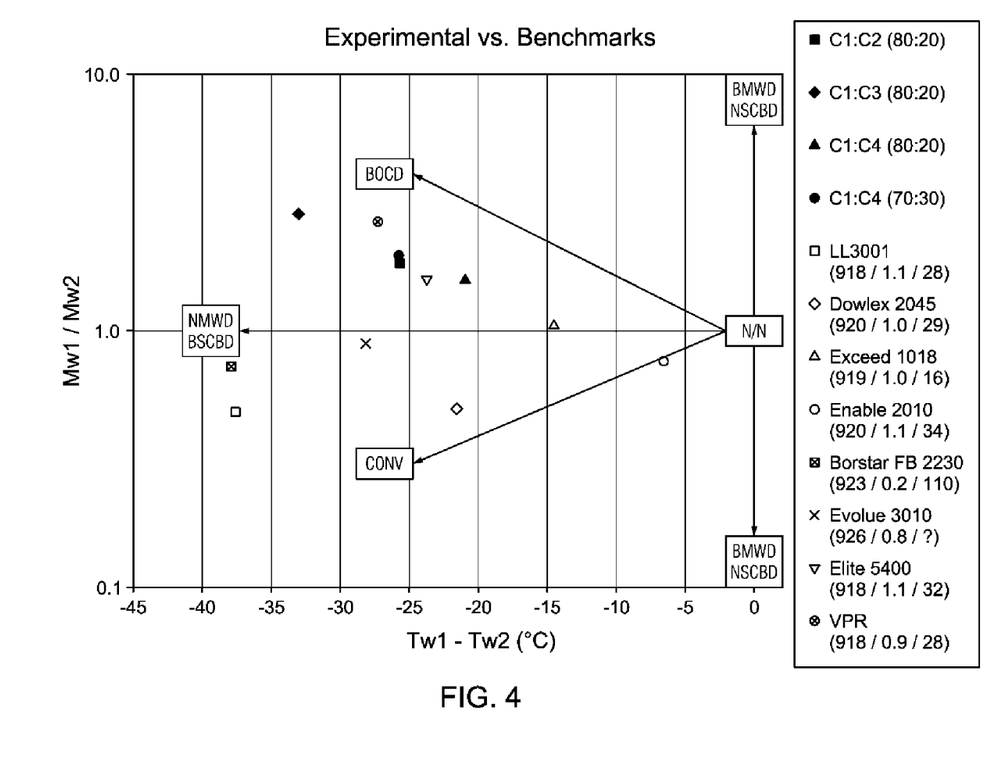
FIG. 4 is a plot of Compositional Distribution (molecular weight as a function of branching) plotting ($M_{w1}/M_{w2}$) values as a function of ($T_{w1}$-$T_{w2}$) for inventive and comparative polymers.

FIG. 4 is a semi-log plot of ($M_{w1}/M_{w2}$) as a function of ($T_{w1}-T_{w2}$) designed to show the important differences in MWD/SCBD combination among inventive examples compared to commercial benchmarks. Such differences are believed to play a key role in determining the trade-off pattern and/or balance of various performance attributes such as stiffness, toughness and processability. The polyethylenes are above the mid-horizontal line, while conventional polyethylenes having typical short-chain branching distribution (SCBD) are below the mid-line. Also in FIG. 4, the narrow short chain branching distribution (NSCBD) region of the plot is highlighted along with the broad short chain branching distribution (BSCBD) region. The polyethylenes are in-between the extremes, represented by an $M_{w1}/M_{w2}$ value of between 0.9 and 10, more preferably 1.5 and 5.

In the plot of FIG. 4 SCBD and MWD are described specified together. That is, the specific combination of molecular weight characteristic and SCB of a particular population is highlighted, rather than the Mw or SCB separately. Therefore, between the NSCBD extreme (far right vertical line) and BSCBD extreme (far left vertical line, not center line) is described the preferred region of the plot. There are two further divisions to set different polyethylene product concepts apart:

The upper half above the center line in FIG. 4 is what is typically called BOCD, that is, the combination of Low Mw/High Tw (low SCB, high density) population with High Mw/Low Tw (high SCB, low density) population.

The lower half below the center line in FIG. 4 is what is typically called "conventional" (Ziegler-Natta-like), that is, the combination of High Mw/Low Tw (low SCB, low density) population with Low Mw/High Tw (high SCB, high density) population. The measurements are summarized in Table 3, where the following are comparative examples:

Dowlex™ 2045 polyethylene obtained from the Dow Chemical Company (Midland, Mich.)

Borstar™ FB2230 polyethylene obtained from Borealis AG (Austria).

Evolue™ 3010 polyethylene from Mitsui Chemical Company (Japan).

Elite™ 5400 polyethylene obtained from The Dow Chemical Company (Midland, Mich.).

Exceed™ 1018 and Enable™ 2010 polyethylenes are obtained from ExxonMobil Chemical Company (Baytown, Tex.)

LL3001 polyethylene is obtained from ExxonMobil Chemical Company (Baytown, Tex.).

VPR is a polyethylene made in a metallocene gas phase process as described in PCT/US2015/015119 (Polymer 1-10, Table 1).

TABLE 3

CFC Analysis of polyethylenes and commercial examples

| Description (density/I$_2$/I$_{21}$) | Mw$_1$ (g/mole) | Mw-1 + 2 (g/mole) | Mw$_2$ (g/mole) | Tw$_1$ (° C.) | Tw1 + 2 (° C.) | Tw$_2$ (° C.) | Mw$_1$/Mw$_2$ | Tw$_1$ − Tw$_2$ (° C.) | (log(Mw$_1$/Mw$_2$))/ (Tw$_1$ − Tw$_2$) |
|---|---|---|---|---|---|---|---|---|---|
| C1:C2 (80:20) A | 206,970 | 161,073 | 112,748 | 60.9 | 73.4 | 86.6 | 1.84 | −25.7 | −0.0103 |
| C1:C3 (80:20) B | 253,391 | 173,329 | 89,206 | 55.6 | 71.7 | 88.7 | 2.84 | −33.0 | −0.0137 |
| C1:C4 (80:20) C | 174,804 | 143,159 | 110,168 | 67.4 | 77.7 | 88.5 | 1.59 | −21.0 | −0.0095 |
| C1:C4 (70:30) D | 203,184 | 151,005 | 103,268 | 63.1 | 76.6 | 89.0 | 1.97 | −25.8 | −0.0114 |
| LL3001 (918/1.1/28) | 107,909 | 164,884 | 223,661 | 54.6 | 73.2 | 92.2 | 0.48 | −37.6 | 0.0084 |
| Dowlex 2045 (920/1.0/29) | 117,305 | 178,018 | 238,061 | 66.4 | 77.3 | 88.0 | 0.49 | −21.6 | 0.0142 |
| Exceed 1018 (919/1.0/16) | 163,239 | 159,808 | 156,716 | 72.4 | 80.0 | 86.9 | 1.04 | −14.5 | −0.0012 |
| Enable 2010 (920/1.1/34) | 103,550 | 121,863 | 136,434 | 75.9 | 79.6 | 82.5 | 0.76 | −6.7 | 0.0179 |
| Borstar FB 2230 (923/0.2/110) | 268,435 | 318,349 | 371,505 | 53.5 | 71.8 | 91.4 | 0.72 | −37.9 | 0.0037 |
| Evolue 3010 (926/0.8/n.a.) | 148,115 | 157,160 | 166,038 | 60.3 | 74.5 | 88.4 | 0.89 | −28.1 | 0.0018 |
| Elite 5400 (918/1.1/32) | 174,160 | 141,389 | 109,611 | 62.0 | 74.1 | 85.8 | 1.59 | −23.8 | −0.0085 |
| VPR (918/0.9/28) | 247,884 | 168,288 | 93,385 | 60.9 | 74.9 | 88.2 | 2.65 | −27.3 | −0.0155 |

Blown film evaluations of the inventive polymers from Table 1 were carried out on a Gloucester blown film line at 60 mil die gap and 2.5 BUR. Further process data is found in Table 4. Film properties at 1.0 mil gauge (25 µm) are summarized below in Table 5A, sealing properties ("heat seal") in FIG. 5B, and comparative film properties and sealing properties in Table 6.

"ESO" is the Energy specific output, and the "rate" is the extrusion output (lb/hr) in film extrusion normalized by the extruder power (hp) consumption and is a measure of a material's processability.

"TDA" is the total defect area. It is a measure of defects in a film specimen, and reported as the accumulated area of defects in square millimeters (mm$^2$) normalized by the area of film in square meters (m$^2$) examined, thus having a unit of (mm$^2$/m$^2$) or "ppm". In Table 4 below, only defects with a dimension above 200 microns are reported. TDA was obtained by an Optical Control System (OCS). This system consists of a small extruder (ME20 2800), cast film die, chill roll unit (Model CR-9), a winding system with good film tension control, and an on-line camera system (Model FSA-100) to examine the cast film generated for optical defects. The typical testing condition for the cast film generation is given below:

Extruder temperature setting (° C.): Feed throat/Zone 1/Zone 2/Zone 3/Zone4/Die: 70/190/200/210/215/215
Extruder speed: 50 rpm
Chill roll temperature: 30° C.
Chill roll speed: 3.5 m/min The film forming system generates a cast film of about 4.9 inch in width and a nominal gauge of 1 mil (25 µm). Melt temperature varies with materials, and is typically around 215° C.

TABLE 5A

Properties of films made from the polyethylenes

| property | fA | fB | fC | fD |
|---|---|---|---|---|
| Gauge (mils) | | | | |
| Average | 1.01 | 1.00 | — | — |
| 1% Secant (psi) | | | | |
| MD | 37,690 | 36,122 | 36,197 | 33,309 |
| TD | 54,281 | 52,906 | 48,264 | 44,280 |
| AVG | 45,986 | 44,514 | 42,231 | 38,795 |
| Tensile Yield Strength (psi) | | | | |
| MD | 1,559 | 1,526 | 1,586 | 1,576 |
| TD | 1,959 | 1,815 | 1,843 | 1,808 |
| Elongation @ Yield (%) | | | | |
| MD | 6.3 | 6.3 | 6.8 | 8.8 |
| TD | 6.2 | 5.3 | 6.3 | 6.7 |
| Tensile Strength (psi) | | | | |
| MD | 9,723 | 9,520 | 9,268 | 8,469 |
| TD | 8,125 | 6,948 | 8,089 | 8,719 |
| Elongation @ Break (%) | | | | |
| MD | 435 | 402 | 412 | 438 |
| TD | 649 | 681 | 635 | 641 |
| Elmendorf Tear | | | | |
| MD (g) | 136 | 111 | 248 | 206 |
| TD (g) | 528 | 619 | 498 | 474 |
| MD (g/mil) | 138 | 111 | 248 | 210 |
| TD (g/mil) | 535 | 639 | 503 | 484 |
| Haze- internal (%) | — | — | 2.2 | 2.2 |
| Gloss (%) | | | | |
| MD | 50.3 | 48.1 | 62.0 | 51.0 |
| TD | 51.4 | 44.2 | 65.0 | 52.0 |

TABLE 4

Production of films from the polyethylenes

| Setting/condition | A | B | C | D |
|---|---|---|---|---|
| TDA (ppm) > 200 | 11 | 14 | 16 | 52 |
| Lay Flat (in) | 23.5 | 23.5 | 23.5 | 23.5 |
| Extruder Zone Temp Settings (° C.) | 154, 210, 193, 177, 178 | 154, 210, 193, 177, 178 | — | — |
| Die/Adap (° C.) | 199 | 199 | 199 | 199 |
| Melt Temperature (° C.) | 203 | 203 | 203 | 203 |
| Air Ring, (° C.) | 11 | 11 | 11 | 11 |
| Press. (in water) | 6.5 | 6.5 | 6.5 | 4 |
| FLH (in) | 18 | 18 | 17 | 21 |
| Line Speed (fpm) | 168 | 168 | 168 | 168 |
| RPM | 60 | 61 | 60 | 61 |
| RATES: | | | | |
| lb/hr | 187 | 189 | 188 | 190 |
| lb/hr/RPM | 3.11 | 3.1 | 3.15 | 3.11 |
| lb/in die | 9.92 | 10.01 | 9.99 | 10.06 |
| Head Pressure (psi) | 3290 | 3230 | 3780 | 3850 |
| % motor load | 56 | 50 | 61 | 61 |
| Horsepower | 18 | 16 | 19 | 20 |
| Torque (HP/RPM) | 0.296 | 0.266 | 0.322 | 0.323 |
| ESO (lb/HP/hr) | 10.54 | 11.67 | 9.79 | 9.65 |

TABLE 5A-continued

Properties of films made from the polyethylenes

| property | fA | fB | fC | fD |
|---|---|---|---|---|
| Dart Drop | | | | |
| (g) | 651 | 669 | 511 | 566 |
| (g/mil) | 645 | 669 | 516 | 566 |
| Puncture | | | | |
| Peak Force (lbs) | 9.22 | 9.37 | 10.41 | 11.14 |
| Peak Force (lbs/mil) | 9.13 | 9.37 | 10.52 | 11.14 |
| Break Energy (in-lbs) | 21.17 | 23.59 | 29.49 | 33.15 |
| Break Energy (in-lbs/mil) | 20.96 | 23.59 | 29.81 | 33.18 |

TABLE 5B

Sealing properties of films made from the polyethylene

| Property | fA | fB | fC | fD |
|---|---|---|---|---|
| Seal Initiation Temperature at 1N force (° C.) | 105.5 | 98.0 | 99.1 | 98.0 |
| Seal Temperature at 5N force (° C.) | 111.8 | 106.6 | 107.4 | 102.6 |
| Maximum Seal force (N) | 10.3 | 10.7 | 10.7 | 10.4 |
| Hot tack initiation temperature at 1N force (° C.) | 103.7 | 97.4 | 96.6 | 97.2 |
| Maximum hot tack force (N) | 9.0 | 14.2 | 14.8 | 12.1 |

TABLE 6

Comparative Films made under the same conditions as inventive films

| Polymer | Exceed 1018HA | Enable 2010HA |
|---|---|---|
| I₂ (g/10 min) | 1.0 | 1.0 |
| I₂₁ (g/10 min) | — | — |
| I₂₁/I₂ | — | — |
| density (g/cm³) | 0.918 | 0.920 |
| Property | | |
| Gauge (mils) | | |
| Average | 0.96 | 1.01 |
| 1% Secant (psi) | | |
| MD | 26,101 | 30,435 |
| TD | 29,745 | 35,613 |
| AVG | 27,923 | 33,024 |
| Tensile | | |
| Yield Strength (psi) | | |
| MD | 1,330 | 1,514 |
| TD | 1,353 | 1,487 |
| Elongation @ Yield (%) | | |
| MD | 5.9 | 7.3 |
| TD | 6.0 | 4.9 |
| Tensile Strength (psi) | | |
| MD | 7,515 | 8,222 |
| TD | 7,726 | 7,343 |
| Elongation @ Break (%) | | |
| MD | 464 | 501 |
| TD | 638 | 700 |
| Elmendorf Tear | | |
| MD (g) | 226 | 117 |
| TD (g) | 429 | 620 |
| MD (g/mil) | 235 | 113 |
| TD (g/mil) | 440 | 602 |
| Haze (%) | >30 | 10.0 |
| Gloss | | |
| MD | 31.0 | 59.0 |
| TD | 32.0 | 60.0 |
| Dart Drop | | |
| (g) | 617 | 206 |
| (g/mil) | 643 | 204 |
| Puncture | | |
| Peak Force (lbs) | 11.04 | 10.67 |
| Peak Force (lbs/mil) | 11.5 | 11.57 |
| Break Energy (in-lbs) | 34.08 | 28.91 |
| Break Energy (in-lbs/mil) | 35.5 | 28.62 |
| Sealing | | |
| Seal Initiation Temperature at 1N force (° C.) | 98.7 | 105.2 |
| Seal Initiation Temperature at 5N force (° C.) | 102.8 | 111.1 |
| Maximum Seal force (N) | 10.0 | 11.3 |
| Hot tack initiation temperature at 1N force (° C.) | 98.8 | 103.7 |
| Maximum Hot tack force (N) | 12.2 | 7.6 |

An additional set of polymerization experiments were performed to demonstrate the unique properties of the inventive polyethylenes. The same catalysts and general conditions were used to generate the polyethylenes in Table 7. In Table 7, the "VPR" polymer is as in Table 3 above, a comparative polyethylene that possesses BOCD character but is unimodal in molecular weight.

Crystallinity by Gradient Density Column (GDC)

The polyethylene's crystalline content can be estimated from density measurements using the following two component model (4):

$$\text{Crystallinity} = \frac{\frac{1}{\rho} - \frac{1}{0.860 \text{ g/cm}^3}}{\frac{1}{0.999 \text{ g/cm}^3} - \frac{1}{0.860 \text{ g/cm}^3}} = \frac{\frac{1}{\rho} - 1.163}{-0.162}, \quad (4)$$

where "ρ" is the gradient density of the sample in grams per cubic centimeter [Y. Haung and B. Brown, 29 J. POLY. SCI.: PART B, 129-137 (1991)]. The crystallinity of polyethylenes depends on the densities assumed for the crystalline and amorphous regions of the molecules: a pure polyethylene crystal has a gradient density of 0.999 g/cm³, while a completely amorphous polyethylene has a gradient density of 0.860 g/cm³. A polyethylene's density as determined by the gradient density method is termed its "total crystallinity".

DSC Analysis

The polyethylenes outlined in Table 7 were also analyzed using differential scanning calorimetry employing 3-5 mg samples sealed in aluminum sample pans. Since the samples' second melt was used, no conditioning was performed. The DSC data was recorded by gradually heating the sample to 180 to 200° C. at a rate of 10° C./min. The sample was kept at the maximum temperature for 5 minutes before the cooling-heating cycle was applied; both were conducted at rates of 10° C./min. The samples were cooled to at or below 40° C. or cooler before being reheated. Both the first and second cycle thermal events were recorded. The melting temperature was measured and reported during the second heating cycle (or second melt). The analysis was conducted with a minimum of three replicates and the average of the three recorded.

The enthalpies of fusion determined from the DSC thermograms were converted to degrees of crystallinity by using the enthalpy of fusion of a perfect polyethylene crystal) ($\Delta H_f^\circ$ of 4110 J/mole. The degree of crystallinity from the replicates were averaged. The cumulative heat of fusion of each polyethylene was determined and the temperatures at 50%, 60%, 70% and 80% of the maximum cumulative heat of fusion noted. Only the temperature at 70% Cumulative Heat Flow is reported in Table 7.

ity; for example 46−39 gives an interfacial content of 7%. The amorphous content is the amount of polyethylene left after accounting for the core crystallinity and the interfacial content: Amorphous content=100−core crystallinity−Interfacial content; for example, 100−39−7 gives an amorphous content of 54%. Density by DSC was then calculated by rearranging equation (3) and using the polyethylene's core crystallinity to determine its density. Density by DSC is for example as follows: 1/(1.168−0.162·(Mass Fraction of Core Crystallinity)).

TABLE 7

Polyethylene Properties in Second set of Experiments

| example | Gradient Density (GDC) (g/cc) | Crystal-linity (%) by GDC | Core Crystal-linity (%) by DSC | Inter-facial Content (%) | Amor-phous Content (%) | Density by DSC | Melt Index (MI) | HLMI | HLMI/MI Ratio | Temperature at 70% Cumulative Heat Flow: Estimated Heat Seal Temp (° C.) | ratio of temp/core crystal-linity | ratio of core crystal-linity/temp | relative value of core crystal-linity/temperature at 70% cumulative heat flow |
|---|---|---|---|---|---|---|---|---|---|---|---|---|---|
| VPR | 0.919 | 46 | 39 | 7 | 61 | 0.9093 | 1.04 | 23 | 22 | 117 | 3.00 | 0.33 | 1.00 |
| VPR | 0.918 | 45 | 38 | 7 | 62 | 0.9083 | 0.87 | 23 | 27 | 118 | 3.11 | 0.32 | 1.00 |
| C1/C3 80:20 | 0.9185 | 46 | 41 | 5 | 59 | 0.9118 | 0.84 | 18 | 22 | 118 | 2.88 | 0.35 | 1.1 |
| C1/C2 80:20 | 0.9204 | 47 | 43 | 4 | 57 | 0.9148 | 0.95 | 27 | 29 | 119 | 2.77 | 0.36 | 1.1 |
| C1/C3 80:20 | 0.9194 | 47 | 45 | 2 | 55 | 0.9179 | 0.96 | 20 | 21 | 121 | 2.69 | 0.37 | 1.1 |
| C1/C3 70:30 | 0.9201 | 47 | 42 | 5 | 58 | 0.9127 | 1.07 | 26 | 24 | 121 | 2.88 | 0.35 | 1.1 |
| C1/C4 80:20 | 0.9211 | 48 | 40 | 8 | 60 | 0.9105 | 2.26 | 57 | 25 | 115 | 2.88 | 0.35 | 1.1 |
| C1/C4 80:20 | 0.9185 | 46 | 40 | 6 | 60 | 0.9106 | 0.73 | 16 | 22 | 118 | 2.95 | 0.34 | 1.0 |
| C1/C3 80:20 | 0.9193 | 46 | 40 | 6 | 60 | 0.9108 | 0.79 | 19 | 23 | 121 | 3.03 | 0.33 | 1.0 |
| C1/C4 70:30 | 0.9193 | 46 | 41 | 5 | 59 | 0.9118 | 1 | 38 | 38 | 122 | 2.98 | 0.34 | 1.0 |

The temperature at 70% Cumulative Heat Flow is an estimate for the Hot Tack Temperature (° C.) of the polyethylene's film. The temperature at 80% Cumulative Heat Flow is an estimate for the Heat Seal Initiation Temp (° C.) of the polyethylene's film. The temperature at 60% Cumulative Heat Flow is an estimate for the polyethylene's "stickiness", which is measure of the ability to produce the polyethylene in a gas phase reactor. The reactor tends to foul at temperatures above the "stickiness temperature", for instance, above 100° C. or 110° C. or 120° C. All three temperatures are indicators: the first two temperatures for film performance and the last temperature for reactor operability.

Crystallinity by DSC

The polyethylenes' crystallinity was determined using DSC methodology, the result termed the polyethylene's "core crystallinity", and is defined as follows (5):

$$\text{Crystallinity} = \frac{\Delta H_f}{\Delta H_f^\circ}, \quad (5)$$

where $\Delta H_f$ is the heat of fusion of the sample and $\Delta H_f^\circ$ is the heat of fusion of a pure polyethylene crystal (4110 J/mole). Each polyethylene's heat of fusion ($\Delta H_f$) was determined from its total heat flow ($\Delta H$ in J/g). For example, a polyethylene's heat of fusion being 1962.8 J/mole (140.2 J/g·14 g/mole) corresponds to a core crystallinity of 47%.

Determination of Interfacial and Amorphous Regions

The "interfacial content" is the difference between the polyethylene's crystallinity by GDC and its core crystallin- Based on the data in Table 7, the inventive process produces polyethylenes that should have an improved balance of stiffness and sealing performance, that is, increased stiffness at any Hot Tack, and increased stiffness at any Heat Seal Initiation temperature, as can be deduced in these data. The data also indicates the inventive polyethylenes will also have higher operability temperatures at any crystallinity (density). This new balance of crystallinity and operability temperature can open a new operating window for making gas phase polyethylenes.

As used herein, "consisting essentially of" means that the claimed polyethylene or polyethylene film includes only the named components and no additional components that will alter its measured properties by any more than 20%, and most preferably means that additional components are present to a level of less than 5, or 4, or 3, or 2 wt % by weight of the composition. Such additional components can include, for example, fillers, colorants, antioxidants, anti-UV additives, curatives and cross-linking agents, aliphatic and/or cyclic containing oligomers or polymers, often referred to as hydrocarbon polyethylenes, and other additives well known in the art. As it relates to a process, the phrase "consisting essentially of" means that there are no other process features that will alter the claimed properties of the polyethylene and/or film produced therefrom by any more than 10 or 20%.

For all jurisdictions in which the doctrine of "incorporation by reference" applies, all of the test methods, patent publications, patents and reference articles are hereby incorporated by reference either in their entirety or for the relevant portion for which they are referenced.

We claim:

1. A polyethylene comprising ethylene derived units and within a range from 0.5 to 20 wt % of C3 to C12 α-olefin derived units by weight of the polyethylene; having
   a density of less than 0.94 g/cm³,
   an $I_2$ value within a range from 0.5 to 20 g/10 min,
   an $I_{21}$ value within a range from 5 to 100 g/10 min,
   an $I_{21}/I_2$ ratio within a range of 18 to 40,
   a value for
   $M_{W1}/M_{W2}$ of at least 0.9, wherein $M_{W1}/M_{W2}$ is a ratio of a weight average molecular weight ($M_{W1}$) for a first half of a temperature rising elution (TREF) curve from a cross-fraction (CFC) analysis to a $M_{W2}$ for a second half of the TREF curve, and
   a value for $T_{W1}-T_{W2}$ within a range from −16 to −36° C., wherein $T_{W1}-T_{W2}$ is a difference of a weight average elution temperature ($T_{W1}$) for the first half of the TREF curve to a $T_{W2}$ for the second half of the TREF curve; and
   formed by a process comprising combining a bridged bis-cyclopentadienyl Group 4 metal catalyst, an unbridged bis-cyclopentadienyl Group 4 metal catalyst, and an activator with ethylene and within a range from 0.1 to 5 wt % (relative to the weight of all monomers) of a C3 to C12 α-olefin at a temperature within a range from 60 to 100° C.

2. The polyethylene of claim 1, wherein the $M_{W1}/M_{w2}$ value is within a range from 0.9 to 5.

3. The polyethylene of claim 1, having an $M_{w1}$ value of greater than 150,000 g/mole.

4. The polyethylene of claim 1, having an $M_{w2}$ value of less than 150,000 g/mole.

5. The polyethylene of claim 1, having a level of short-chain branching on the $M_{w2}$ fractions that is greater than that for the $M_{w1}$ fractions.

6. The polyethylene of claim 1, having a total number of internal unsaturations within a range from 0.1 per 1000 carbons to 0.8 per 1000 carbons.

7. The polyethylene of claim 1, having a total number of terminal unsaturations within a range from 0.001 per 1000 carbons to 0.4 per 1000 carbons.

8. The polyethylene of claim 1, having a % crystallinity by DSC of 40% or greater.

9. A film comprising the polyethylene of claim 1 having a Dart Drop value of at least 500 g/mil, and a Gloss (MD or TD) of at least 40%.

10. The film of claim 9, having an average thickness within a range from 10 μm to 100 μm.

11. The film of claim 9, having a Seal Initiation Temperature at 1N force (° C.) within a range from 80° C. to 115° C.

12. The film of claim 9, having a Maximum Hot Tack Force of greater than 10N.

13. The film of claim 9, having a MD Tensile Strength within a range from 7,800 psi to 10,000 psi; and a TD Tensile Strength within a range from 6,500 psi to 8,500 psi.

14. The film of claim 9, having an MD Elongation at Break within a range from 350 to 600%, and a TD Elongation at Break within a range from 450 to 800%.

15. The film of claim 9, having an MD Elmendorf Tear within a range from 100 to 300 g, and a TD Elmendorf Tear within a range from 350 to 650 g.

16. The film of claim 9, having a MD 1% Secant Flexural Modulus within a range from 25 to 50 kpsi, and a TD 1% Secant Flexural Modulus within a range from 20 to 70 kpsi.

17. The film of claim 9, wherein the polyethylene has a total number of internal unsaturations is within a range from 0.1 per 1000 carbons to 0.8 per 1000 carbons.

18. A process to form the polyethylene of claim 1 wherein the bridged bis-cyclopentadienyl Group 4 metal catalyst is selected from catalysts represented by the following formula:

where M is a Group 4 metal; and each $R^1$ to $R^8$ are independently selected from C1 to C20 alkoxides, or C1 to C20 substituted or unsubstituted alkyl groups; provided that at least one of $R^1$, $R^2$, $R^3$, $R^4$, $R^6$, $R^7$, $R^8$ is a linear C3 to C10 substituted or unsubstituted alkyl group, wherein any two of $R^1$ or $R^2$ and/or $R^7$ and $R^8$ can form an aromatic ring comprising 5 to 7 carbons;
T is a bridging group; and
each X is, independently, a univalent anionic ligand, or two X are joined and bound to the metal atom to form a metallocycle ring, or two X are joined to form a chelating ligand, a diene ligand, or an alkylidene ligand.

19. The process of claim 18, wherein the monomers, catalysts and activator are combined in a gas phase reactor.

20. The process of claim 18, wherein the bridged bis-cyclopentadienyl Group 4 metal catalyst is present within a range from 50 to 85 wt % by weight of the two catalysts, and the unbridged bis-cyclopentadienyl Group 4 metal catalyst is present within a range from 50 to 15 wt % by weight of the two catalysts.

21. The process of claim 18, wherein the catalysts and activator are supported on a solid support material.

22. The process of claim 18, wherein the process is a gas phase process carried out at a gas velocity of at least 2 ft/s.

23. The process of claim 18, wherein the bridged bis-cyclopentadienyl Group 4 metal catalyst is selected from structures wherein "T" is a di-C1 to C5 alkyl or di-phenyl substituted silyl group and each of $R^1$ to $R^8$ is independently a C1 to C5 alky.

* * * * *